United States Patent [19]
Phillips

[11] 3,864,552
[45] Feb. 4, 1975

[54] SPEEDCLOCK

[76] Inventor: Melvin Richard Phillips, P.O. Box 5334, Titusville, Fla. 32780

[22] Filed: Mar. 15, 1973

[21] Appl. No.: 341,329

[52] U.S. Cl.......... 235/92 T, 235/92 R, 235/92 TC, 235/92 DN, 235/92 PL
[51] Int. Cl. .......................................... H03k 21/16
[58] Field of Search......... 235/92 DN, 92 T, 92 FQ, 235/92 TF, 92 PD, 92 GA, 92 TC

[56] References Cited
UNITED STATES PATENTS

| | | |
|---|---|---|
| 3,209,130 | 9/1965 | Schmidt.......................... 235/92 DN |
| 3,230,383 | 1/1966 | MacArthur......................... 235/92 T |
| 3,637,996 | 1/1972 | Seymour......................... 235/92 DN |

Primary Examiner—Gareth D. Shaw
Assistant Examiner—Robert F. Gnuse
Attorney, Agent, or Firm—Duckworth, Hobby & Allen

[57] ABSTRACT

A speedclock includes means for generating a repetitive train of electrical pulses, and means coupled thereto for counting a given number of the pulses during successive incremental time periods. The given number of pulses are displayed as a predetermined increase in distance equal to a constant speed rate multiplied by the sum of the incremental time periods.

5 Claims, 3 Drawing Figures

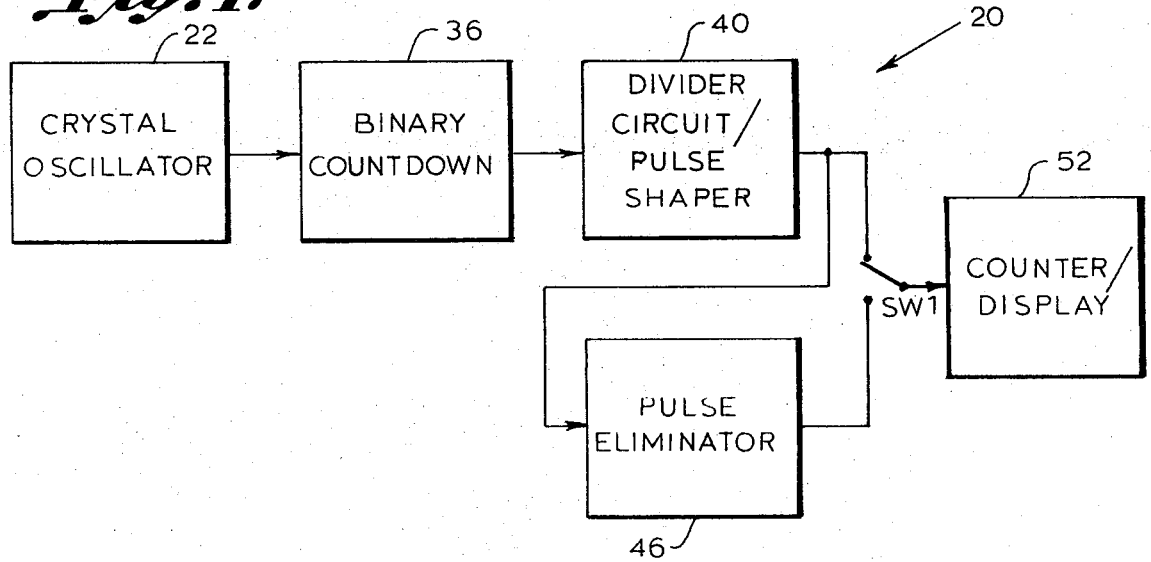
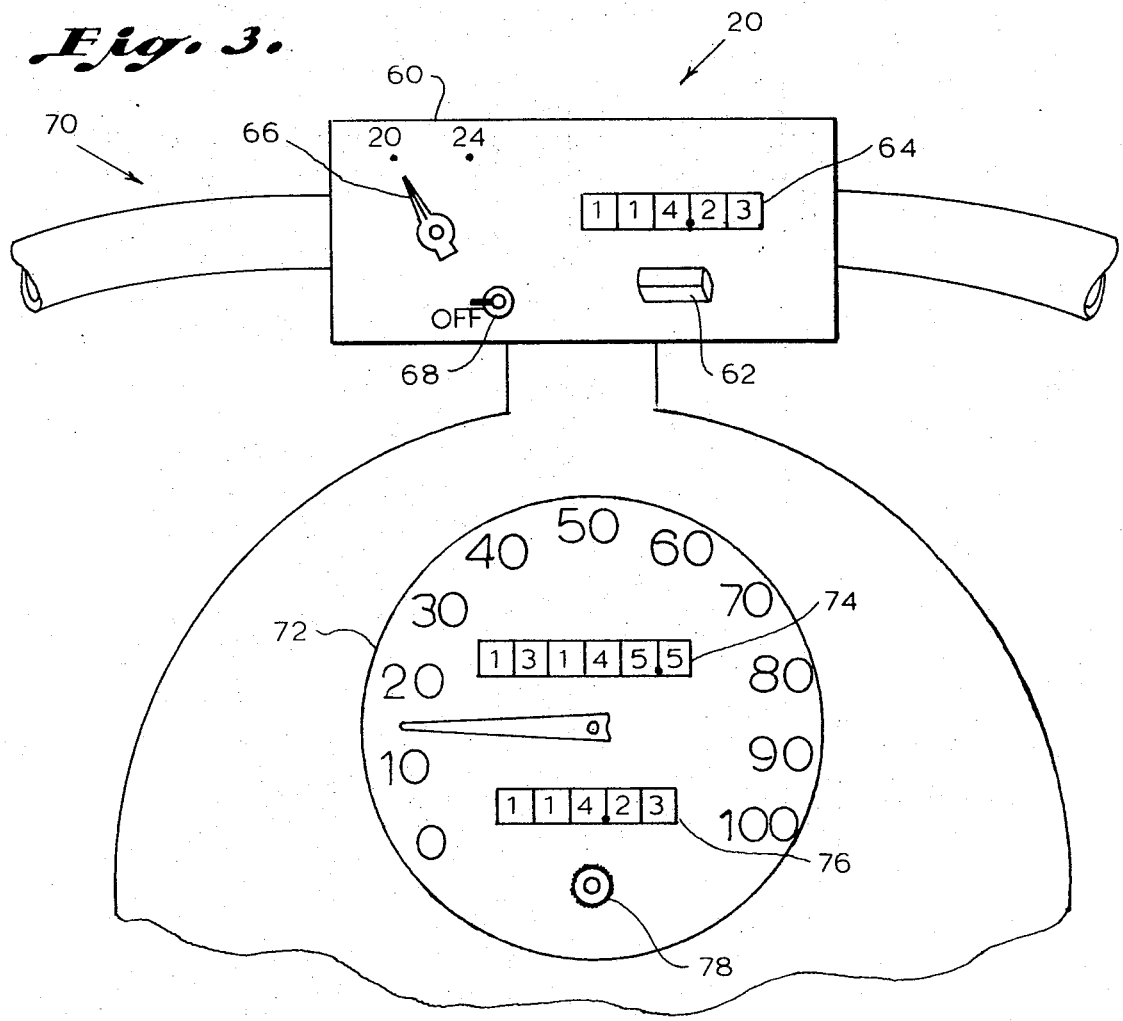

SPEEDCLOCK

BACKGROUND OF THE INVENTION

1. Field of the Invention

The present invention relates to odometers and registers, and particularly relates to time based distance standards.

2. Description of the Prior Art

In the odometer and register art, a variety of prior art techniques have been devised for providing a distance indication or readout relative to the distance actually traveled by a vehicle. Generally such prior art apparatus employ a mechanical or electrical means link in some fashion to a wheel or axle of the vehicle to measure the rotational distance traveled.

There also have been devised special purpose odometers which are designed to indicate the distance traveled only at a given speed, or above a given speed. Such odometers are employed, for example, in "for-hire" vehicles such as buses, taxis and the like to ascertain the degree to which a driver is driving at excessive speeds. Examples of such odometers are taught by Magnuski in U.S. Pat. No. 3,406,775, and Eret in U.S. Pat. No. 2,828,074. Other special purpose odometers are taught by Short in U.S. Pat. No. 3,206,116 and Byles in U.S. Pat. No. 3,233,827.

In recent years, a certain type of motorcycle skill and endurance contest, known as the "Enduro," has become popular and an "Enduro" contestant is required to ride his or her motorcycle over a measured rough terrain course at a precise average speed, in order to arrive at various checkpoints unknown to the rider at the end of predetermined time intervals. By way of example, many "Enduro" course times are computed on the basis of an average speed of 24.00 miles per hour; although in some Enduros a portion of the course may be computed at one speed and another portion at a different speed. It will be recognized by some that an "Enduro" is similar to the so-called "road rally," and that the driver is required to maintain a precise average speed between checkpoints. This task is much more difficult in an Enduro however since the cyclist is not driving along a paved roadway (as in a rally) but is required to negotiate a rough terrain course including various hazards.

SUMMARY OF THE INVENTION

The present invention contemplates a speedclock comprising means for generating a repetitive train of electrical pulses and means coupled to the generating means for counting a given number of the pulses during successive incremental time periods. Means are coupled to the output of the counting means for displaying the given number of pulses as a predetermined increase in a distance equal to a constant speed rate multiplied by the sum of the incremental time periods.

The present invention also contemplates a method for comparing an actual distance with a time-based distance standard, which method comprises the following steps. First a train of repetitive electrical pulses is generated. A given number of these pulses are then counted during seccessive incremental time periods, and are displayed as a predetermined increase in a distance equal to a constant speed rate multiplied by the sum of the incremental time periods. This displayed distance is then compared with means for indicating an actual distance traveled.

While not limited to such, the speedclock, or time-responsive odometer of the present invention is especially useful in motorcycle "Enduro" contests or similar endeavors requiring the traversal of a given distance at a precise average speed.

THE DRAWING

FIG. 1 is a block diagram of a speedclock in accordance with the present invention.

FIG. 3 is a representation of the display portion of the speedclock of FIG. 1 juxtaposed near the speedometer and odometer of a motorcycle, illustrating the manner in which the speedclock of the present invention is employed in an Enduro.

DETAILED DESCRIPTION

Figure 2:
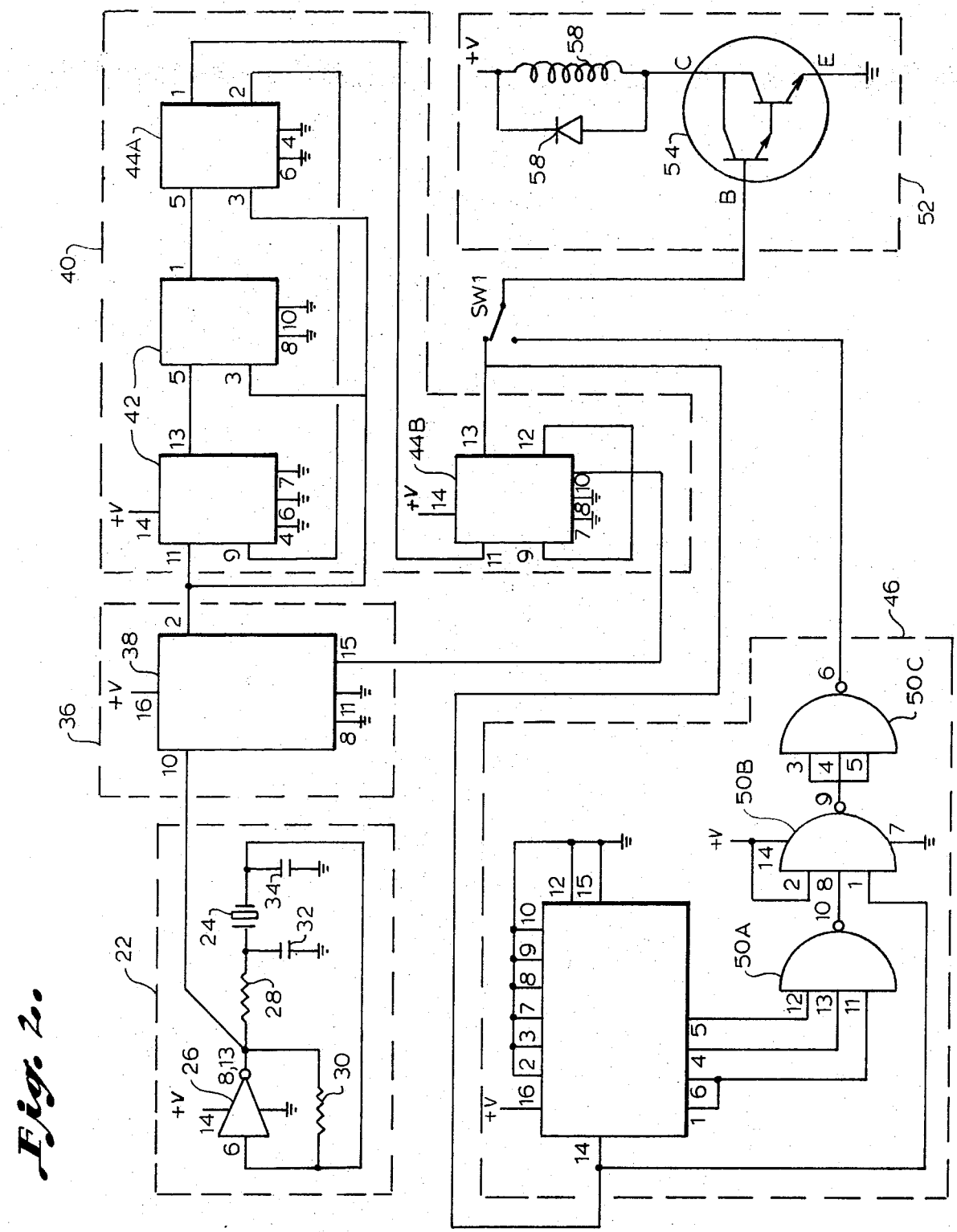
FIG. 2 is a schematic circuit diagram of the block diagram of FIG. 1.

An embodiment of the speedclock of the present invention will now be described with reference to the drawings.

Noting FIGS. 1 and 2, the speedclock, referred to generally as 20, includes a crystal oscillator 22 adapted to oscillate at a given frequency which consists of an amplifier and a feedback network connected from the amplifier output to the amplifier input. With specific reference to FIG. 2, the feedback network in this example comprises resistor 30 and the crystal pi network consisting of crystal 24 and capacitors 32 and 34. Suitably the crystal 24 comprises any one of a variety of commercially available crystal standards presently used in electronic devices. Crystal 24 in this example suitably oscillates at a frequency of 32,768 Hertz with a small tolerance for error in frequency. The amplifier 26 output is applied to the crystal pi network by resistor 28. Resistor 28 also limits the power dissipated in the crystal 24. Amplifier 26 is an integrated circuit. While the type of integrated circuit 26 is not critical, suitably this component comprises a CD4007A device manufactured by RCA Corporation, with the respective circuit components coupled to the CD4007A by terminal designations shown in FIG. 2.

Noting FIG. 1, the speedclock 20 further comprises a binary countdown circuit 36 coupled to the output of the crystal oscillator 22 (via terminals 8, 13 of the integrated circuit 26 — note FIG. 2). The binary countdown circuit 36 receives the output of the crystal oscillator 22, and shapes this output to achieve a repetitive train of electrical pulses, each pulse being repeated during a successive time interval corresponding to the countdown taking place. For example the countdown circuit 36 may comprise a known circuit configuration capable of "counting down," or dividing the frequency of the crystal oscillator 24 by the binary 2 raised to a predetermined power. In this example the frequency of the crystal oscillator 22 is suggested to be 32,768 Hertz. By employing a binary countdown circuit 36 which consists of 13 stages, the input frequency is counted down by $2^{13}$ (2 to the 13th power) and the output of the binary countdown circuit 36 (pin 2, device 38 — note FIG. 2) comprises a pulse repetition rate of 4 pulses per second. The output of intermediate stages can supply smaller countdowns: for example in this embodiment the 11th stage output supplies a pulse repetition rate of 16 pulses per second (pin 15, device 38 — note FIG. 2). In this example, an integrated circuit 38 (note FIG. 2) commercially available from RCA Corporation and designated as the CD4020A may be employed at the binary countdown circuit 36, and which is connected to terminal designations as shown in FIG. 2. It will be understood however that this invention is not limited to any particular component, since equivalent circuits and components may also be employed.

Again noting FIG. 1, the output of the binary countdown circuit 36 is received by a divider circuit and pulse shaper 40. The divider circuit is adapted to divide the repetitive pulse train by a number N other than binary; for example in this embodiment the divider portion of 40 comprises two integrated circuits 42 and 44A which are coupled together as shown by terminal designations in FIG. 2 to form a known network which divides the 4 pulses per second output of the binary countdown circuit 36 b 6. The resulting output of the divider circuit portion of 40 comprises a repetitive pulse train having a pulse repetition rate of two-thirds pulse per second and a duty cycle of fifty per cent (50%). The function of the pulse shaper portion of 40 is to reduce the duty cycle of the output pulse from 50% to some smaller percentage. This reduction may be accomplished by but is not limited to the use of a toggle type bistable multivibrator. The input (pin 11, device 44 — note FIG. 2) is driven high by the output of the divide by N circuit above producing a high output (pin 13, device 44B — note FIG. 2). At some predetermined time later the reset input (pin 10, device 44B — note FIG. 2) is driven high which in turn resets the output to a low condition. If the reset is accomplished during the first half of the input cycle, the duty cycle is reduced and the output frequency is the same as the input frequency. Again noting FIG. 2, in this example device 44B becomes the pulse shaper. Input, pin 11 is driven by the divide by N output and the reset pin 10 is driven by the 16 pulses per second output, pin 15, of the binary countdown 38. When connected as shown by terminal designations in FIG. 2, the repetitive pulse train has a period of 1.50 seconds, and each pulse has a duration of 31.25 milliseconds or a duty cycle of approximately 2.08%. In this example, integrated circuits 42 and 44, commercial units available from but not limited to RCA Corporation devices designated as the CD4013A, may be employed as the divide circuit/pulse shaper 40 when connected to terminal designations as shown in FIG. 2. However it will be appreciated by those skilled in the art that various modifications may be made to the circuit described thus far without departing from the scope of the present invention.

Again noting FIG. 1, the output of the divider circuit/pulse shaper is received by the pulse eliminator circuit 46 which is adapted to eliminate a predetermined number of pulses from a predetermined cycle length of input pulses. While the method of accomplishing this pulse elimination can be implemented by various means, in this example a divide by N counter and proper decoding logic are used to open and close a transmission gate thus allowing the predetermined number of input pulses to reach the output per input cycle length. If, as in this example, the cycle length is 6 input pulses and one pulse is eliminated from each input cycle, the average output pulse rate when calculated over an integral number of input cycles is 5/6 of the input rate. Again referring to FIG. 2, in this embodiment, suitably the divide by N counter 48 has a predetermined N of 6. The decoding logic 50A opens the transmission gate 50B if and only if the output of the divide by N counter 48 corresponds to a count of six (6). At all other times the input pulses are transmitted to the output of the transmission gate 50B thus resulting in an output pulse rate that is 5/6 of the input pulse rate. The inverter 50C functions to make the output pulses the same polarity as the input pulses. The divide by N counter 48, decoding logic 50A, transmission gate 50B, and inverter 50C may all be implemented by commercially available integrated circuits. Integrated circuit 48 may be an RCA Corporation device designated as the CD4018A. Intwgrated circuits 50A, 50B, and 50C may be contained in one device available from RCA Corporation and designated as the CD4023A. When connected to terminal designations shown in FIG. 2, the output pulse rate has an average period of 1.8 seconds when calculated over an integral multiple of 6 input pulses. Each pulse has a duration of 31.25 milliseconds. However, again it will be appreciated by those skilled in the art that various pulse elimination rates may be employed and equivalent circuits and components employed without departing from the scope of the present invention.

The pulse train outputs from the divider circuit/pulse shaper 40 or the pulse eliminator 46 are selected by switch SW1 (note FIG. 1) and fed into a counter circuit 52, which counts a given number of the pulses during each of a succession of incremental time periods. A display component is coupled with the counter 52, and includes means coupled to the counter for displaying the counted given number of pulses as an increase in distance equal to a constant speed rate multiplied by the sum of the incremental time periods.

The counter and display circuit may take one of several forms including an electro-mechanical counter/display unit. Such a counter/display mechanism utilizes the known technique of converting the electrical pulse input to a mechanical force which is suitably coupled to the viewed display such that input counts are displayed in decades. Also included is a mechanical means for resetting all decades to a zero display at any chosen time by depressing an externally available reset button. Again referring to FIG. 2, in this example the electro-mechanical counter/display is schematically represented by the inductor 56. Suitably drive transistor 54 converts the input pulses to the high current necessary to drive the electro-mechanical counter/display 56. The diode 58 is suitably employed to suppress spurious voltages generated by the inductance of the electro-mechanical cointer/display 56. In the present example the counter/display circuit 52 is designed such that each pulse is counted and is displayed as equal to 0.01 mils; thus 100 pulses will therefore represent one mile, and since 100 pulses occur every 150 seconds when the input is derived from the divider circuit/pulse shaper 40, the pulse repetition rate of two-thirds pulse per second is equivalent to a 24.0 miles per hour constant rate of speed. When the counter/display input is derived from the pulse eliminator 46, 102 pulses occur every 183.6 seconds (corresponding to an average pulse period of 1.8 seconds) and the average pulse repetition rate of 5/9 pulses per second in this example is equivalent to a 20.0 miles per hour constant rate of speed. While the drive transistor 54 is not critical, a suitable device is manufactured by General Electric Corporation and is designated as the D40C1. The electromechanical counter display 56 is commercially available from several sources including, in this example, Durant Digital Instruments and designated as the 4Y41314417 MEQ–6VDC. The diode 58 is available from several commerical sources and is designated by the industry standard as 1N914. However, those skilled in the art will recognize that the counter/display 52 is not limited to the present example and could be implemented by use of electronic digital decade counters to which are coupled digital decoding logic that drive suitable display devices (seven segment, Nixie, etc.) without departing from the scope of the present invention.

The manner in which the speedclock of the present invention is used with a motorcycle odometer will be described with reference to FIG. 3. The speedometer 72 of a motorcycle 70 generally includes an odometer having two displays. The odometer display 74 functions to display the cumulative mileage the motorcycle has traveled and cannot be reset. The odometer display 76 can be reset by knob 78 to a reading of 000.00 miles at any chosen time and registers cumulative mileage from that time forward. The odometer display 74 generally includes mileage readouts through the tens of thousands while odometer display 76 includes mileage readouts from hundreds of miles to 0.1 mile and preferably 0.01 miles.

The speedlock 20 of the present invention is preferably mounted as close as possible to the odometer 76, such that their respective readings may be easily monitored. To this end, speedclock 20 is mounted in a water-tight case 60 and includes a reset button 62 for returning the mileage indication of the display 64 to a 000.00 miles indication. A switch 66 on the face of the casing 60 allows the driver to preselect the constant speed utilized by the speedclock 20 in computing distance. An on-off switch 68 is employed to energize the speedclock 20 at the start of the Enduro. During the contest the driver compares the readout of the display 64 with the reading on the odometer 76 to assist in determining whether the correct average speed is being maintained.

I claim:

1. An odometer and speedclock combination comprising:

an odometer for measuring an actual distance of travel;

means for generating a repetitive train of electric pulses;

means coupled to said generating means for counting a given number of said pulses during successive incremental time periods, said number of pulses during each incremental time period being preselected to represent a predetermined increase in a distance equal to a constant speed rate multiplied by the sum of said incremental time periods;

means positioned adjacent said odometer and coupled to the output of said counting means for displaying a count of said pulses as a desired distance of travel;

a pulse eliminating circuit for selectively eliminating a number of input pulses per cycle of input pulses into said counting means;

said input pulses into said counting means being proportional to an increase in a distance equal to a constant speed rate multiplied by the sum of said incremental time periods; and wherein said odometer and said display means are positioned such that said desired distance of travel can be readily compared to said actual distance measured by said odometer.

2. The combination recited in claim 1 wherein said pulse train generating means comprises a crystal oscillator.

3. The combination recited in claim 2 further comprising binary counting means coupled to the output of said crystal oscillator.

4. The combination recited in claim 3 further comprising a dividing and pulse shaping circuit coupled to the output of said binary counting means.

5. The combination recited in claim 4 wherein said counting and displaying means comprises means for selecting a count of a number of pulses as said increase in a distance equal to a constant speed rate multiplied by the sum of said incremental time periods, said counting and displaying means being selectively coupled to the output of one of said dividing and pulse shaping circuit means and said pulse eliminating means.

* * * * *